United States Patent [19]
Hagenson et al.

[11] Patent Number: 5,300,547
[45] Date of Patent: Apr. 5, 1994

[54] REINFORCED POLYPROPYLENE COMPOUNDS WITH IMPROVED PROPERTIES

[75] Inventors: Mary J. Hagenson; William H. Beever, both of Bartlesville, Okla.

[73] Assignee: Phillips Petroleum Company, Bartlesville, Okla.

[21] Appl. No.: 968,779

[22] Filed: Oct. 30, 1992

[51] Int. Cl.$^5$ ............................. C08K 5/17; C08K 3/46
[52] U.S. Cl. ...................................... 524/188; 524/494; 524/504
[58] Field of Search .................. 524/494, 504, 188; 525/127, 131

[56] References Cited

U.S. PATENT DOCUMENTS

| | | | |
|---|---|---|---|
| 3,437,550 | 4/1969 | Paul, Jr. | 161/93 |
| 4,000,111 | 12/1976 | Henman et al. | 260/42.15 |
| 4,082,720 | 4/1978 | Henman et al. | 260/42.15 |
| 4,663,369 | 5/1987 | Kawai et al. | 523/203 |
| 4,990,557 | 2/1991 | Lee | 524/494 |

OTHER PUBLICATIONS

CertainTeed Corporation, "Chopped Strand 930", sales brochure, 1985.
CertainTeed Corporation, "Chopped Strand 967", sales brochure, 1985.
CertainTeed Corporation, "Chopped Strand 993", sales brochure, 1985.
PPG Industries, Inc., "Type 3090 Chopped Strand", Bulletin F-179A, 1988 ®.
PPG Industries, Inc., "Type 3540 Chopped Strand", Bulletin F175A.
PPG Industries, Inc., "Type 3541 Chopped Strand", Bulletin F-178A.
PPG Industries, Inc., "Type 3830 Chopped Strand", Bulletin F-177A.

*Primary Examiner*—Kriellion S. Morgan
*Attorney, Agent, or Firm*—Morrison Bennett

[57] ABSTRACT

Properties of articles made from either glass reinforced polypropylene or glass reinforced carboxylated polypropylene are improved by use of at least one amino-functional silane and at least one polyurethane film former in the sizing of the glass or added to the composition separately from the glass.

18 Claims, No Drawings

REINFORCED POLYPROPYLENE COMPOUNDS WITH IMPROVED PROPERTIES

FIELD OF THE INVENTION

This invention relates to glass reinforced thermoplastic resins.

BACKGROUND OF THE INVENTION

In recent years various solid polymers of polypropylene have gained increasing popularity as thermoplastic molding materials for making a great variety of molded objects. Because of their unique combination of low density, high abrasion resistance, good chemical resistance, relatively high softening point and low cost, propylene polymers, particularly the crystalline propylene polymers, are good candidates for use as fiber reinforced thermoplastic compositions. Glass fiber reinforced polyolefin resins have better stiffness, impact resistance and heat resistance than unreinforced polyolefin resins. These glass fiber reinforced polyolefin resins have been broadly used for various industry parts such as automobile parts and electrical parts.

However, use of fiber reinforced polypropylene has been to some extent limited by difficulty of securely bonding the polymer matrix to the inorganic fiber. Even when polyolefins such as crystalline polypropylene are glass fiber reinforced, particularly when they are melt-kneaded together, the resulting material properties are not optimum because of poor adhesion of the matrix resin to the glass fibers. In the case of polypropylene, this is particularly a problem because of the non-polarity of polypropylene. When larger amounts of glass fibers are added to polyolefin resins, especially polypropylene, the fluidity of the polymer is lowered, making it difficult to use the fiber reinforced resins for molding applications.

It has been found that chemically modifying the crystalline polypropylene with an ethylenically unsaturated organic acid or organic acid anhydride will result in modified polypropylene from which articles having improved properties can be molded.

Silanes having both a substituent reactive with the surface of an inorganic fiber and an acid reactive with an organic matrix have been used with chemically modified polypropylene, particularly crystalline polypropylene, to enhance bonding of the matrix material to the inorganic fiber reinforcement, with resulting increases in strength of articles made from such molding compositions.

However, there is still a continuing need for glass reinforced resins from which can be molded articles having a good balance of various physical properties, mechanical properties, electrical properties and thermal properties.

SUMMARY OF THE INVENTION

It is an object of this invention to provide glass reinforced polymers of modified polyolefins with enhanced properties and methods for making these compositions.

It is another object of this invention to provide glass reinforced polypropylene compositions with enhanced tensile elongation and impact strength properties and methods for making those compositions.

It is yet another object of this invention to provide articles of manufacture made from the inventive compositions and methods for making these articles of manufacture.

In accordance with one embodiment of this invention, a composition comprises:
(a) a polymer of propylene;
(b) glass; and
(c) at least one amino-functional silane. Optionally, one or more polyurethane binders or film formers may be included in the composition.

In accordance with another embodiment of this invention, a composition comprises:
(a) a polyolefin which has been grafted with a grafting compound selected from the group consisting of vinyl-polymerizable hydrolyzable silanes, carboxylic acid, carboxylic acid derivatives, carboxylic acid anhydrides, carboxylic acid anhydride derivatives, and mixtures thereof in the presence of a free radical generator;
(b) glass and
(c) at least one amino-silane. Optionally, one or more polyurethane binders or film formers may be included in the composition.

Processes for making these compositions are provided. Articles of manufacture made from these compositions are provided. Methods for making articles of manufacture from these compositions are provided.

DETAILED DESCRIPTION OF THE INVENTION

The mechanical and thermal properties and property retention characteristics of polymers of polyolefins are improved by compounding with glass fibers. These polymers are further improved by chemical coupling of the polymer matrix to the glass reinforcing fibers. The resultant compounds have excellent strength, and good thermal and chemical resistance, which are beneficial in a variety of applications. For example, products made with the glass-reinforced polymers of this invention have exhibited significantly higher heat deflection temperatures and percentages of elongation than products made with other glass-reinforced polypropylene polymers.

Compounds from which can be made articles having surprisingly excellent tensile and impact properties can be obtained by (a) modifying polyolefin polymers with unsaturated silanes, carboxylic acids, and/or carboxylic acid anhydrides in the presence of a free radical generator in the polymer melt, and then (b) reinforcing these modified polymers with glass which has been sized with a composition which contains at least one amino-functional silane and at least one polyurethane binder or film former.

Glass which has not been sized with materials containing at least one amino-functional silane and polyurethane binders and/or film formers can be used if at least one amino-functional silane is either applied to the glass or is added to the composition mixture during compounding.

It has also been discovered that surprising and unexpected increases in tensile elongation and impact strength properties can be obtained for articles made from glass reinforced polymers of propylene without having to chemically modify the polymers of propylene. This can be done by use of glass reinforcement having sizing compositions which contain at least one amino-functional silane. The amino-functional silane can be in the sizing on the glass, added to the polymeric material at the time the glass fibers are introduced, or added later with other additives.

The compounds of this invention can be made into articles which have superior tensile elongation properties, good thermal and chemical resistance, and improved impact strength. They can be made using less glass reinforcement material than compounds not using the inventive choice of silanes and thus are more processable. The invention compounds can be used for injection molding, thermoforming, or other suitable processes. Particularly good tensile strength, impact strength and flexibility can be achieved by use of the inventive composition in injection molded articles. These materials can be especially useful for applications where good elongation is desired such as for snap-lock fittings.

Polymers

Any of the normally solid polymers of propylene (polypropylene) can be employed in this invention. The term "polypropylene" is intended to include normally solid polypropylene homopolymers which are substantially crystalline, isotactic, or syndiotactic, and copolymers of propylene having a comonomer content of copolymerized ethylene, butene or other 1-olefin (alpha-olefin) up to about 5 mol percent.

Presently preferred are the normally solid substantially crystalline polypropylenes having a nominal melt flow in the range of about 1 to 20, presently more preferably about 8 to about 14, as determined by ASTM D-1238-73 Condition L.

Considered particularly useful in the present invention are polypropylenes prepared according to the methods disclosed in U.S. Pat. No. 4,376,851, which is hereby incorporated herein by reference.

For the embodiments of this invention requiring carboxylated polypropylenes, any polyolefin homopolymer or copolymer which has carboxyl groups on the polyolefin chain can be used. This can be accomplished by any of several means, including grafting by any manner effective to introduce carboxyl groups onto the polyolefin chain. Grafting is usually done in the presence of a free radical generator and usually by a solution or melt process.

The carboxylated polyolefins presently preferred, when used in this invention, are grafted polymers prepared by grafting a polymer of a $C_2$ to $C_8$ mono-alpha-olefin or its copolymers with unsaturated mono- and polycarboxylic-containing acids and derivatives, unsaturated mono- and polycarboxylic-containing anhydrides and derivatives, and mixtures thereof, in the presence of a free radical generator. Presently most preferred is a carboxylated polypropylene, particularly maleinated polypropylene. The grafting can be done by any effective means, including those disclosed in U.S. Pat. No. 4,003,874, which is hereby incorporated herein by reference.

The carboxylated polyolefin may, if desired, be neutralized or partially neutralized. This is usually done with a metal ion, such as $Na^+$, $Zn^{++}$, or the like, to form an ionomer.

Carboxylated polypropylenes are commercially available. One such carboxylated polypropylene is produced by Himont U.S.A., Inc., of Wilmington, Del., and marketed under the trade designation of Pro-fax PC-072 Polypropylene. Another carboxylated polypropylene is produced by E. I. DuPont de Nemours and Company of Wilmington, Del., under the trade designation of FUSABOND ® P. These products are believed to be graft polymers of polypropylene and maleic anhydride. The amount of maleic anhydride functionally is believed to be less than 2% by weight. Another carboxylated polypropylene is produced by BP Performance Polymers, Inc., of Hackettstown, N.J., and marketed under the trade designation of Polybond ®. These products are believed to be graft polymers of polypropylene and acrylic acid. The amount of acrylic acid functionally is believed to be about 6% by weight.

The polypropylenes employed in this invention can be utilized in any convenient form such as pellets from a finishing extruder or from hot strands, or fluff or powder obtained from a polymerization recovery step.

Grafting Compounds

The polyolefin polymers are modified by grafting with a radically polymerizable unsaturated grafting compound selected from the group consisting of vinyl-polymerizable unsaturated hydrolyzable silane compounds, carboxylic acids and derivatives, carboxylic acid anhydrides and derivatives, and mixtures thereof, in the presence of a free radical generator.

The vinyl-polymerizable unsaturated hydrolyzable silanes which can be used in this invention contain at least one silicon-bonded hydrolyzable group, such as, for example, alkoxy, halogen, and acryloxy, and at least one silicon-bonded vinyl-polymerizable unsaturated group such as, for example, vinyl, 3-methacryloxypropyl, alkenyl, 3-acryloxypropyl, 6-acryloxyhexyl, alkyloxypropyl, ethynyl, and 2-propynyl. The silicon-bonded vinyl-polymerizable unsaturated group preferably is an ethylenically unsaturated group. Any remaining valances of silicon not satisfied by a hydrolyzable group or a vinyl-polymerizable unsaturated group are satisfied by a monovalent hydrocarbon group, such as, for example, methyl, ethyl, propyl, isopropyl, butyl, pentyl, isobutyl, isopentyl, octyl, decyl, cyclohexyl, cyclopentyl, benzyl, phenyl, phenylethyl, and naphthyl. Suitable silanes of this type include those represented by the formula:

$$R_a SiX_b Y_c$$

wherein R is a monovalent hydrocarbon group, X is a silicon-bonded hydrolyzable group, Y is a silicon-bonded monovalent organic group containing at least one vinyl-polymerizable unsaturated bond, a is an integer of 0 to 2, preferably 0; b is an integer of 1 to 3, preferably 3; c is an integer of 1 to 3, preferably 1; and $a+b+c$ is equal to 4.

Suitable vinyl-polymerizable unsaturated hydrolyzable silanes that can be used in this invention include, but are not limited to, 3-acryloxypropyltriethoxysilane, ethynyltriethoxysilane, 2-propynyltrichlorosilane, 3-acryloxypropyldimethylchlorosilane, 3-acryloxypropyldimethylmethoxysilane, 3-acryloxypropylmethyldichlorosilane, 3-acryloxypropyltrichlorosilane, 3-acryloxypropyltrimethoxysilane, allyldimethylchlorosilane, allylmethyldichlorosilane, allytrichlorosilane, allyltriethoxysilane, allyltrimethoxysilane, chloromethyldimethylvinylsilane, [2-(3-cyclohexenyl)ethyl]dimethylchlorosilane, 2-(3-cyclohexenyl)ethyltrimethoxysilane, 3-cyclohexenyltrichlorosilane, diphenylvinylchlorosilane, diphenylvinylethoxysilane, (5-hexenyl)dimethylchlorosilane, (5-hexenyl)dimethylchlorosilane, 5-hexenyltrichlorosilane, 3-methacryloxypropyldimethylchlorosilane, 3-methacryloxypropyldimethylethoxysilane, 3-methacryloxypropylmethyldiethoxysilane, 3-methacryloxypropyltrichlorosilane, methyl-2-(3-cyclohexenyl)-ethyldichlorosilane, methyl-3-(trimethylsiloxy)crotonate, 7-octenyltrichlorosilane, 7-octenyltrimethoxysilane, 1-phenyl-1-trimethylsiloxyethylene, phenylvinyldichlorosilane, styrylethyltrimethoxysilane, 1,3-tetradecenyltrichlorosilane, 4-[2-(trichlorosilyl)ethyl]cyclohexene, 2-(trimethylsiloxy)ethylmethacrylate, 3-(trimethylsilyl)cyclopentene, vinyldimethylchlorosilane, vinyldimethylethoxysilane, vinylethyldichlorosilane, vinylmethyldiacetoxysilane, vinylmethyldichlorosilane, vinylmethyldiethoxysilane, vinyltrimethylsilane, vinyltrichlorosilane, vinyltriethoxysilane, vinyltrimethoxysilane, vinyltris(beta-methoxyethoxy)silane, vinyltriacetoxysilane, 3-methacryloxypropyltrimethoxysilane, and 3-methacryloxypropyltris(beta-methoxyethoxy)silane and mixtures thereof.

The preferred silane compounds are vinyltrichlorosilane, vinyltriethoxysilane, vinyltrimethoxysilane, vinyltris(beta-methoxyethoxy)silane, vinyltriacetoxysilane, 3-methacryloxypropyltrimethoxysilane, 3-methacryloxypropyltris(beta-methoxyethoxy)silane, and mixtures thereof. These compounds are preferred due to commercial availability, ease of use, as well as good polymer property improvement.

The radically polymerizable unsaturated grafting compound also can be a carboxylic acid or an anhydride thereof, with about three to about 10 carbon atoms, with preferably at least one olefinic unsaturation, and derivatives thereof. Examples of the carboxylic acid and anhydride include, but are not limited to, an unsaturated monocarboxylic acid such as acrylic acid or methacrylic acid; an unsaturated dicarboxylic acid such as maleic acid, fumaric acid, itaconic acid, citraconic acid, allyl succinic acid, muconic acid (mesaconic acid), glutaconic acid, norbornene-2,3-dicarboxylic acid (tradename Nadic acid), methyl Nadic acid, tetrahydrophthalic acid, or methylhexahydrophthalic acid; an unsaturated dicarboxylic anhydride such as maleic anhydride, itaconic anhydride, citraconic anhydride, allyl succinic anhydride, glutaconic anhydride, Nadic anhydride (tradename for norbornene-2,3-dicarboxylic anhydride), methyl Nadic anhydride, tetrahydrophthalic anhydride, or methyltetrahydrophthalic anhydride; or a mixture of two or more thereof. Of these unsaturated carboxylic acids and acid anhydrides thereof, maleic acid, maleic anhydride, Nadic acid, methyl Nadic acid, methyl Nadic anhydride, or Nadic anhydride is preferably used.

The radically polymerizable unsaturated grafting compound is present in the reaction mixture in an amount sufficient to improve the properties of the resultant grafted polymer. Usually, the amount is in the range of about 0.1 to about 2 parts of radically polymerizable unsaturated grafting compound per 100 parts of polymer (phr), preferably in the range of about 0.2 to about 1.6 phr, and most preferably in the range of about 0.4 to about 1.2 phr. If too much grafting compound is used, not all of the grafting compound will be grafted onto the polymer and no additional appreciable polymer property improvement is obtained; an excess is economically undesirable. Use of too little grafting compound does not improve or enhance the polymer properties. In general, the grafting compounds used in this invention have similar amounts of functionality.

The grafting reaction must occur in the presence of a free radical generator, also called a free radical intiator. An organic peroxide is preferably used as the free radical initiator in the graft modification reaction as described above. More specifically, preferred examples of an organic peroxide include, but are not limited to, alkyl peroxides, aryl peroxides, acyl peroxides, aroyl peroxides, ketone peroxides, peroxycarbonates, peroxycarboxylates, hydroperoxides, and other organic peroxides. Examples of an alkyl peroxide include diisopropyl peroxide; di-tert-butyl peroxide; 2,5-dimethyl-2,5-di-(tert-butylperoxy)hexyne-3; a,a'-bis(tert-butylperoxy)-diisopropyl benzene; and 2,5-dimethyl-2,5-di-(tert-butylperoxy)hexane. An example of an aryl peroxide is dicumyl peroxide. An example of an acyl peroxide is dilauroyl peroxide. An example of an aroyl peroxide is dibenzoyl peroxide. Example of a ketone peroxide include methyl ethyl ketone peroxide and cyclohexanone peroxide. Examples of hydroperoxide include tert-butyl hydroperoxide and cumene hydroperoxide. Preferred examples of a free radical initiator are di-tert-butyl peroxide; 2,5-dimethyl-2,5-di(tert-butylperoxy)hexyne-3; 2,5-dimethyl-2,5-di(tert-butyl-peroxy)hexane, dicumyl peroxide; a,a'-bis(tert-butylperoxy)diisopropylbenzene; and mixtures thereof. Higher molecular weight organic peroxide compounds are preferred because they are safer and easier to handle and store, as well as being more stable at higher temperatures.

The organic peroxide is present in the grafting reaction in an amount sufficient to effectuate a grafting reaction. Usually, the amount is in the range of about 0.001 to about 5 parts of organic peroxide per 100 parts per polymer (phr), preferably in the range of about 0.001 to about 1 phr, and most preferably in the range of about 0.005 to about 0.4 phr. Too much organic peroxide can still initiate the grafting reaction, but polymer degradation, such as vis-breaking of the polymer, can occur. A concentration of organic peroxide which is too low does not initiate the grafting reaction.

Amino-functional Silanes

This invention requires the presence of at least one amino-functional silane. This can be a silane or silanes incorporated in the sizing on commercially available glass or it can be silane or silanes added to the glass in a posttreatment, added to the polymer, or added during mixing of the polymer with the glass and any other additives.

At least one of the amino-functional silanes should be an alkoxysilane containing at least one substituted or unsubstituted amino group in the molecule. The amino group can be either primary or secondary; alkoxysilanes with both a primary and a secondary amino group may also be used. The alkoxy group must be hydrolyzable and generally will be methyl, ethyl, butyl, acetyl or a group with similar functionality.

Specific examples of amino-functional silanes presently preferred in this invention include N-(2-aminoethyl)-3-aminopropyltrimethoxysilane, N-beta-(aminoethyl)-gamma-aminopropylmethyldimethoxysilane, N-(6-aminohexyl)aminopropyl-trimethoxysilane, gamma-aminopropyltriethoxysilane, N-phenyl-gamma-aminopropyltrimethoxysilane, trimethoxysilylpropyldiethylenetriamine, 1-trimethoxysilyl-2-1(p,m-aminomethyl)phenylethane, p-aminophenyltrimethoxysilane, phenylaminoalkyltrimethoxysilane aminoethylaminomethylphenethyltrimethoxysilane, (aminoethylaminomethyl)phenyltrimethoxysilane, gamma-aminopropyltrimethoxysilane, gamma-aminopropyl-dimethylethoxysilane, 3-aminopropylmethyldiethoxysilane, bis[3-(triethoxysilyl)propyl]amine, bis[3-(trimethoxysilyl)propyl]ethylenediamine, 4-aminobutyldimethylmethoxysilane, and 4-aminobutyltriethoxysilane.

Presently most preferred amino-functional silanes include, but are not limited to, A-1100 (gamma-aminopropyltriethoxysilane), A-1120 (N-beta-(aminoethyl)-gamma-aminopropyltrimethoxysilane), and A-1160 (gamma-ureidopropyltriethoxysilane), all available from Union Carbide Corporation.

In addition to the amino alkyl functional silane, most glass sizing compositions contain at least one other silane. The second organo silane coupling agent present in the aqueous chemical treating composition can be a lubricant modified amino functional organo silane coupling agent, polyamino functional organo silane coupling agent, mixtures of these and an epoxy functional organo silane coupling agent and a vinyl functional organo silane coupling agent. The lubricant modified amino functional organo silane coupling agent is available from Union Carbide under the trade designation A-1108 coupling agent. The polyamino functional organo silane coupling agent is available from Union Carbide under the trade designation A-1120.

An amount of one or more amino-functional silanes sufficient to increase the tensile strength and impact strength of articles made from the invention compositions is useful in this invention. Generally the amino-functional silane or silanes, when incorporated in the sizing on the glass, should be present in an amount in the range from about 0.001 weight percent to about 5 weight percent, based on total weight of the glass and sizing materials. More preferably, the amino-functional silane or silanes are present on the glass in an amount in the range from about 0.01 weight percent to about 1 weight percent, based on total weight of the glass and sizing materials. Presently, most preferably the amino-functional silanes are present on the glass in a range from about 0.03 weight percent to about 0.8 weight percent, based on total weight of the glass and sizing materials. When glass with sizing which does not have a polyurethane film former is used, then the amino-functional silane or silanes added should be present in an amount in the range from about 0.1 to about 2 weight percent, based on total weight of the composition, more preferably from about 0.2 to about 1 weight percent, based on total weight of the composition, and most preferably, from about 0.3 to about 0.8 weight percent, based on total weight of the composition. Use of an insufficient amount of amino-functional silane would result in minimal improvement in properties of articles made from the invention compositions. Use of an excess of the amino-functional silane would be economically undesirable.

Polyurethane Film Former

The sizings on the glass fibers useful in this invention are believed to contain polyurethane polymers which have proved effective in the aqueous chemical treatment of glass fibers. The polyurethane polymer traditionally is utilized in aqueous treating compositions in the form of an aqueous emulsion or latex. These have proven satisfactory in assisting in the production of treated glass fibers that have minimum breakage or unraveling of a bundle of fiber, when the fiber bundles are cut into short lengths for mixing with polymeric materials.

The polyurethane polymer can be any aqueous dispersible, emulsifiable or solubilizable polymer reaction product of a polyol, including glycols, and polyisocyanates including diisocyanates with limited formation of alophanate and biuret groups.

Nonexclusive examples of suitable polyisocyanates, which are employed to produce the polyurethane polymer used with the aqueous sizing composition of the present invention, include those having an average NCO functionality of at least about 2, such as, for example, polymethylene polyphenyl isocyanates; suitable organic diisocyanates, for example 2,3-toluene-diisocyanate, 2,6-toluene-diisocyanate, hexamethylenediisocyanate, p,p'-diphenylethanediisocyanate, p-phenylenediisocyanate, hydrogenated methylene diphenyldiisocyanate, polyisocyanate, naphthalene diisocyanate, dianisidine diisocyanate; mixtures of one or more polyisocyanates and the like.

NCO-containing prepolymers also can be used. These include the reaction products of an excess of an organic diisocyanate with polyhydroxyl-containing compounds having from 2 to about 8 OH groups per molecule such as, for example, ethylene glycol, glycerine, trimethylolpropane, pentaerylthritol, sorbitol, sucrose, mixtures thereof and/or with dihydroxyl-containing compounds such that the average hydroxyl functionality in the mixture is at least about 2.0. It is preferred that these polyurethanes are liquid; however, in the event that they are solids, or semisolids or of a relatively high viscosity such that blending with the other components would be difficult or inconvenient, they may be prepared in a suitable solvent or by melting and then emulsified into an oil-in-water emulsion with suitable surfactants.

Nonexclusive examples of suitable polyol or dihydroxyl-containing compounds which may be used in forming the polyurethane include ethylene glycol, propylene glycol, butylene glycol, pentanediol, hexanediol, diethyleneglycol, diproylene glycol, bisphenol A, resorcinol, catechol, hydroquinone, mixtures thereof, adducts of a dihydroxyl-containing compound and a viscinal epoxy compound such as, for example, ethylene oxide, 1,2-propylene oxide, 1,2-butylene oxide, epichlorohydrin, epibromohydrin, mixtures thereof and the like. When the dihydroxyl-containing compound is a solid, it is suitably employed by either dissolving it in a suitable solvent or melting it and then converting it into an oil-in-water emulsion by use of suitable surfactants and water.

Curable, blocked polyurethane polymers which are aromatic, aliphatic or alicyclic in nature can be used. The emulsions or dispersions are formed by dissolving the polyurethane prepolymer in a nonreactive organic solvent for the polyurethane in a sufficient amount, for example 20–50 percent by weight based upon the weight of the solution, adding sufficient surfactants with the proper HLB range and then gradually mixing the solution with sufficient water to form a stable emulsion of droplets of the solution in the water. These blocked polyurethane resins are formed by the reaction of a polyisocyanate, such as toluene diisocyanate adducts of hydroxyl terminated polyether or polyester resins with an end blocking compound containing active hydrogen atoms such as an amide or polyamide according to conventional techniques for the production of polyurethane resins. The polyisocyanate can be referred to as a prepolymer, i.e., an adduct of a simple diisocyanate with a suitable polyfunctional resin.

Particularly suitable polyurethane polymers are those that are substantially aliphatic or alicyclic in nature where the majority of the polyurethane polymeric chain is constituted of aliphatic or hydrogenated aromatic, or alicyclic moieties. Particularly suitable aqueous emulsions of polyurethane polymers are "Rucothane®" latices designated as 2010L, 2020L, 2030L, 2040L, 2050L, and 2060L, available from the Ruco Chemical Corporation, New York. These materials include a thermoplastic urethane latice having varied particle sizes and are characterized as high molecular weight aliphatic isocyanate based thermoplastic elastomers in aqueous dispersions using anionic or nonionic surfactants. The most preferred polyurethane used is one that is a carboxylated polyurethane to assist in water dispersiblity. The Rucothane latices are based on aliphatic components and have a polymer solids content in stable emulsions ranging from 55–60 weight percent. The Rucothane latices have a Brookfield viscosity RVF4 in centipoise at 2 RPM ranging from 7,000 for 2060L and 2030L latices up to 25,000 for the 2020L latex.

Additional examples of polyurethane resins that can be used are the polyurethane resins available from Witco Chemical Company under the trade designation Witcobond, such as the material Witcobond W290H. This material has a solids content of between 61 and 63 percent, Brookfield viscosity (Spindle 3, 60 RPM, LVF) between 200 centipoise and 600 centipoise, a pH between 7 and 9 and a particle size of 5 microns. The particle charge for the W290H is anionic. Also, the Mobay XW urethane latices can be used; these are available from the Organics Division of Mobay Chemical Corporation under the trade designations XW-110, XW-111 and XW-114.

The amount of the polyurethane polymer used in the aqueous sizing composition is in the range of about 0.1 to about 10 weight percent, preferably 1 to 3 weight percent, of the aqueous sizing composition; or about 20 to about 60 weight percent of the solids of the aqueous sizing composition.

In addition to the polyurethane polymer, or a mixture of an epoxy polymer and polyurethane polymer, a copolymer of an epoxy polymer and polyurethane polymer can be used. These materials can be formed by use of polyepoxide prepolymer having one or more oxirane rings and also having open oxirane rings, which are used as hydroxyl groups for the dihydroxyl-containing compounds for reaction with diisocyanates or polyisocyanates. The isocyanate moiety opens the oxirane ring and the reaction continues as an isocyanate reaction with a primary or secondary hydroxyl group. There should be sufficient epoxide functionality on the polyepoxide resin to enable the production of an epoxy polyurethane copolymer still having effective oxirane rings. Linear polymers are produced through reactions of diepoxides and diisocyanates. The di- or polyisocyanates can be aromatic or aliphatic although the aliphatic di- or polyisocyanates are preferred for better thermal stability and non-yellowing of the chemically treated glass fibers.

The aqueous dispersion or emulsion of an epoxy polyurethane copolymer can be prepared by reacting the copolymer with a primary or secondary amine to form an epoxide-amine adduct. With the secondary amine, the reaction occurs through the amine opening the epoxide ring forming a tertiary amine and a secondary hydroxyl group. The epoxide amine adduct is solubilized and obtains a cationic character by further reaction with an acid to form a tertiary amine acid salt. Optionally a solvent such as a water-miscible solvent, nonexclusive examples of which are esters, ethers or ketones, can be employed. A suitable class of polyepoxide resins having isocyanate or polyisocyanate functionality is a polymeric material containing two or more epoxy groups per molecule. The polyepoxides are of a relatively high molecular weight of at least 350, and preferably within the range of 350 to 2,000. These polyepoxides are combined with the blocked, crosslinkable isocyanate derivatives. The blocked isocyanate derivatives act as crosslinking or curing agents for the polyepoxide to produce epoxy polyurethane copolymers. Types of polyepoxide polymers which can form the epoxide amine adducts are given in U.S. Pat. No. 4,148,772 (Marchetti, et al.), where the portions of this patent relating to the description of the polyepoxide polymers and the epoxide-amine adducts are incorporated herein by reference. Also the polyepoxide amine adducts which are chain extended with organic polyols with or without the use of a catalyst can be employed as taught in U.S. Pat. No. 4,148,772; those portions of this patent also hereby incorporated herein by reference.

A suitable epoxy polyurethane copolymer for the present invention is that available from Celanese Chemical Company Specialty Resins, under the trade designation CMDW 60-5520 epoxy resin dispersion. This material is an aqueous dispersion of a urethane modified epoxy resin with an epoxide equivalent weight of 540 having a solids content of 60 percent. There are no organic solvents present and the dispersion is thixotropic. The epoxy polyurethane polymer can be cured through both epoxy functionality and hydroxyl functionality. Curing agents most conveniently employed are those which are water soluble or dispersible and which are stable in aqueous media. Examples include, but are not limited to, dicyandiamide, substituted amidizoles, aliphatic and aromatic amines, melamine resins and urea formaldehyde resins. However, it is preferred that curing agents are not used in the aqueous chemical treating composition for the film forming polymers. The amount of the epoxy polyurethane copolymer in the aqueous treating composition can be in the range of about 0.1 to about 10 weight percent and preferably from about 3 to about 7 weight percent of the aqueous treating composition.

The amounts of the film forming polymers in the aqueous chemical treating composition can vary somewhat depending upon the polymeric matrix to be reinforced. When the epoxy polyurethane copolymer is used with the polyurethane polymer, it is preferred that the epoxy polyurethane is present in a predominant amount of the solids of the film forming materials present in the aqueous chemical treating composition. The amount of the film forming materials present in the aqueous chemical treating composition can range in an amount between about 1 and about 20 weight percent of the aqueous chemical treating composition.

Glass Fibers

The glass fiber reinforcement improves the properties, such as, for example, the mechanical and thermal properties, of articles made from the polymer. Glass reinforcements having a variety of compositions, filament diameters and forms are useful in this invention.

Glass fiber diameters are usually given a letter designation between A and Z. The most common diameters used in glass reinforced thermoplastics are G-filament (about 9 $\mu$m) and K-filament (about 13 $\mu$m). Several forms of glass fiber products can be used for reinforcing thermoplastics. These include yarn, woven fabrics, continuous roving, chopped strand, mats, etc. Continuous filament strands are generally cut into lengths of ⅛, 3/16, ¼, ⅜, ½, and 1 inch or longer for compounding efficacy in various processes and products.

The glass fibers presently preferred for use in this invention have an average cross-sectional thickness in the range from about 3 to 30 microns, preferably from about 8 to about 10 microns and have an average length in the range from about 2 to about 50 millimeters, preferably from about 2.5 to about 5 millimeters.

Any fibrous silicon oxide material can be used. Examples of types of glass include, but are not limited to, type A glass (an alkali glass), type E glass (a boroaluminosilicate), type C glass (a calcium aluminosilicate), and type S glass (a high-strength glass). Type E glass is presently preferred due to economic reasons and commercial availability.

Commercial glasses sold for use as reinforcement material in thermoplastics are usually sized during either the fiber formation process or in a post treatment, and thus are sold with sizing materials already incorporated.

The amount of sizing on the glass fiber product typically ranges from about 0.2 to about 1.5 weight percent based on total weight of the glass and the sizing, although loadings up to 10 percent may be added to mat products.

From about 0.2 to about 0.6 weight percent of sizing compound, based on total weight of sizing compound and glass, is presently preferred for chopped strand glass fiber.

Depending upon what thermoplastic is to be used, the intended applications, and variations in glass processed by different manufacturers even for the same intended end uses, there are differences in the sizing compositions. The compositions are usually proprietary and many are not disclosed by the manufacturers.

The sizing compositions usually contain a lubricant, which provides protection for the glass fiber strand; a film former or binder which gives the glass strand integrity and workability; and a coupling agent which provides better adhesion between the glass fiber strand and the polymeric materials that are being reinforced with the glass fiber strand. The lubricant, film-former, and coupling agent can be a single compound or a mixture of two or more compounds. Additional agents which may be used in sizing compositions include emulsifiers, wetting agents, nucleating agents, and the like.

The film former is usually water soluble or water emulsifiable during processing and must be non-sensitive to water after curing. Examples of film formers include, but are not limited to, polyesters, epoxy resins, polyurethanes, polyacrylates, polyvinyl acetates, polyvinyl alcohols, styrene-butadiene latexes, starches, and the like.

The coupling agent is usually a silane coupling agent that has a hydrolyzable moiety for bonding to the glass and a reactive organic moiety that is compatible with the polymeric material which is to be reinforced with the glass fibers. The presently preferred coupling agent is one of the amino-functional silanes described in another section of this application.

A number of commercially available glass fiber reinforcements have been designed to produce optimum tensile strength and thermal performance in polyolefins. One such glass reinforcement product, OCF 457 BA, Owens Corning Fiberglas Corporation, is commercially available for use in chemically-coupled polypropylene. This product was also recommended by the manufacturer for use in stereoregular polymers of branched higher alpha-olefins, such as polymethylpentene. It is believed that the film former in the sizing composition for OCF 457 BA glass fibers is a carboxylic styrene-butadiene latex and that the coupling agent is an amino-functional silane (3-aminopropyltriethoxysilane), although the exact composition of the sizing is not disclosed by the manufacturer. Other commercial glass reinforcements designed for optimum use in polyolefins include PPG 3830, produced by Pittsburgh Plate Glass, Pittsburgh, Pa., and CertainTeed 967, produced by CertainTeed Corporation of Valley Forge, Pa. Surprisingly, when used to reinforce grafted or ungrafted polypropylene, these glasses, sized for use in polyolefins, yield only moderate improvements in properties.

The glass sizing compositions for use in this invention include those which have one or more amino-functional silanes, and one or more polyurethane film formers. Such sizing formulations are designed to give optimum results in nylon and polyethylene terephthalate resin systems, and are commercially available. Five such particularly suited commercial glass fiber reinforcements are: CertainTeed Chopped Strand 993 and Chopped Strand 93B, produced by CertainTeed Corporation of Valley Forge, Pa.; OCF 492AA, produced by Owens Corning Fiberglas Corporation, Toledo, Ohio; and PPG 3540 and PPG 3541, produced by Pittsburgh Plate Glass, Pittsburgh, Pa. Chopped Strand OCF 492AA, PPG 3540, CertainTeed 993 and 93B are G-filament glasses (about 9 $\mu$m in diameter). Chopped strand PPG 3541 is a K-filament glass (diameter about 13 $\mu$m). When these fibers are used to reinforce polypropylene polymers, excellent tensile strength and heat deflection are obtained.

Since glasses with this sizing composition are designed for use in nylons and polyesters, it is unexpected and surprising that they will be useful for reinforcing polypropylene polymers because of the difference in chemical functionality between these two different classes of polymers.

It has also been discovered that the addition of amino-functional silanes to glasses sized for use in polyolefins and which do not use polyurethane as the film former, such as OCF 457 BA, results in a significant increase in tensile strength and heat deflection temperature in grafted branched higher alpha-olefin compounds. Suitable amino-functional silanes, include, but are not limited to, A-1100 (gamma-aminopropyltriethoxysilane), A-1120 (N-beta-(aminoethyl)gamma-aminopropyltrimethoxysilane), and A-1160 (gamma-ureidopropyltriethoxysilane), all available from Union Carbide Corporation. Amino-functional silanes can be mixed with the glass prior to compounding with the polymer, and/or added to the polymer melt during the compounding process.

The glass fibers should be present in the range of about 5 to about 70 weight percent, based on the weight of the total product. Preferably, the glass fibers are present in the range of about 10 to about 60 weight percent, and more preferably in the range of about 15 to about 45 weight percent. Using too small an amount of glass fiber does not improve the polymer properties. Having too much glass fiber results in not enough polymer to coat the glass fibers; i.e., the fibers are not "wetted out."

Antioxidants

For protection against thermal and oxidative degradation antioxidants such as hindered phenols may be used. Some presently preferred examples of these are disclosed in U.S. Pat. No. 3,285,855, which is hereby incorporated herein by reference.

In general, preferred antioxidants are thermally stable at the processing temperature employed. The type(s) of stabilizer(s) used depends on the final application or use of the polymer. Numerous polymer additives for stabilization of polyolefins are commercially available and are usually selected from the group consisting of additional hindered phenols, hindered amine light stabilizers, thioesters, aliphatic thio compounds and mixtures thereof. Hindered phenol antioxidants are presently preferred. The antioxidant which is presently most preferred is available from Ciba-Geigy Corporation as "Irganox ® 1010", the active component of which is believed to be tetrakis (methylene 3-[3,5-di-t-butyl-4-hydroxphenyl] propionate) methane. Other suitable antioxidants include, but are not limited to:

(A) Borg Warner's "Ultranox ® 626", the active agent of which is bis[2,4-di-t-butyl phenyl pentaerythritol] diphosphite;
(B) Ciba-Geigy's "Irganox ® 259", the active agent of which is 1,6-hexamethylene bis(3,5-di-t-butyl-4-hydroxy-hydrocinnamate) and/or 1,6-hexamethylene bis(3-[3,5-di-t-butyl-4-hydroxyphenyl]-propionate);
(C) Ferro Corporation's "OXI-Chek ® 116", the active agent of which is octadecyl 3,5-di-t-butyl-4-hydroxyhydrocinnamate;
(D) Ciba-Geigy's "Irganox ® 1098", the active agent of which is N,N'-hexamethylene bis[3,5-di-t-butyl-4-hydroxyhydrocinnamide]; and
(E) Einmont/Ferro's "ANOX ® 20", the active ingredient of which is believed to be tetrakis (methylene 3-[3,5-di-t-butyl-4-hydroxyphenyl]proprionate) methane.

Other Polymer Additives

Other additives can optionally be incorporated into the polymer, before, along with, or after adding the reinforcing material, to achieve additionally desired benefical polymer properties.

General exemplary additives include, but are not limited to, antioxidant synergists, UV absorbers, heat stabilizers, nucleating agents, pigments, surface active agents, plasticizing agents, optical brighteners, antistatic agents, flame retardants, emulsifiers, lubricating agents, anticorrosive agents, metal inhibitors, mold release agents such as low molecular weight polyethylene wax, toughener, impact improvers, and the like.

Processing lubricants can also be added to enhance polymer properties. Examples of processing lubricants include, but are not limited to, fatty acids containing from about 10 to about 20 carbon atoms and the metal salts thereof. Usually, metal stearates, such as, for example, calcium stearate and zinc stearate, and/or metal laurates are used as processing lubricants and/or acid scavengers for polyolefins. If corrosion is a potential problem, one or more corrosion inhibitors can be added.

Any additive can be combined with the polymer according to any method known in the art. Examples of incorporation methods include, but are not limited to, dry mixing in the form of a powder and wet mixing in the form of a solution or slurry. In these types of methods, the polymer can be in any form, such as, for example, fluff, powder, granulate, pellet, solution, slurry, and/or emulsion. Any additional stabilizers or additives can be blended with the polymer prior to mixing with the reinforcing material, added to the polymer melt during the grafting or glass reinforcing process, and/or added during reprocessing of the grafted, glass reinforced polymer.

Usually, the total quantity of additives is not more than about 20 weight percent of the total weight of the composition, although higher amounts could be used if desired.

Preparation

The compositions of this invention are prepared by mixing together the components in any order by any convenient means. For example, any suitable method with blender or tumbling means may be used. Examples of these methods include, but are not limited to, dry mixing in the form of a powder, wet mixing in the form of a solution or slurry, and melt extrusion compounding.

The polypropylene, the grafting agents (if used), the glass, and any other additional additives may be mechanically blended together in the desired proportions with the aid of any suitable mixing device conveniently used for mixing rubbers or plastics, such as, for example, a differential roll mill, a Banbury mixer, or an extruder.

In these types of methods, the polypropylene, the grafting agents (if used), the reinforcement or filler and any other components and additives used, can be in any form, such as, for example, fluff, powder, granulate, pellet, solution, slurry, and/or emulsion. Any additive can be combined with the polymers according to any method known in the art. Examples of incorporation methods include, but are not limited to, dry mixing in the form of a powder and wet mixing in the form of a solution or slurry.

Melt extrusion compounding can be carried out using any suitable method such as in single screw or twin screw extruders or other melt extruders at temperatures above the melting point of the polypropylene polymer. Generally, temperatures in the range of about 350° F. to about 600° F. would be used. Melt extrusion compounding is the presently preferred method of combination, with temperature ranges from about 350° F. to about 450° F. presently preferred for most embodiments of this invention.

Preferably the polypropylene polymer is stabilized with an antioxidant prior to mixing with the grafting agents (if used), glass and other additives. For ease of operation, the initial antioxidant charge is usually solution or slurry mixed with the polypropylene polymer prior to drying and handling of the polymer. If insufficient stabilizer is added, oxidative degradation may occur.

Additional stabilizers or additives can be mixed with the glass reinforcing materials prior to or during combining with the polypropylene polymer. The types of stabilizers and/or other additives used depends on the final application or use of the polymer.

The grafting reaction must occur in the polymer melt. Thus, the temperature of the reaction is in the range from about the polypropylene polymer melting point to about the polypropylene polymer decomposition temperature. Preferably, the reaction temperature is in the range from about 20° C. above the polypropylene polymer melting point to about the decomposition temperature of the polymer. Most preferably, the lower end of the temperature range is utilized to minimize any thermal degradation effects to the polypropylene polymer.

The time required for the grafting reaction is a length sufficient for the grafting to occur. Usually, the time is in the range of about 10 seconds to about 30 hours, preferably in the range of from about 15 seconds to about 3 hours. Most preferably, the reaction time is in the range of from about 30 seconds to about 10 minutes. Shorter times, such as less than 5 minutes, are preferred to minimize thermal degradation effects to the polymer.

The grafting reaction can be carried out by either batch or continuous processes, provided that all components are well dispersed and well blended. A continuous in situ process is presently preferred for ease of operation. One example of a continuous process is to add the stabilized polymer(s), grafting compound(s), and free radical generator(s) at the throat of an extruder, then add glass, amino-functional silane(s), additional stabilizers and other additives to the polymer melt through a downstream feedport. Alternatively, all components can be dry mixed and then extruded.

A batch or "two-step" process can also be used. In this two-step process the polypropylene polymer or polymers are combined with the essential prophylactic hindered phenol stabilizer, grafting compound(s) and free radical generator(s) in an initial pass through an extruder; then, the stabilized, grafted polypropylene polymer can be repackaged, stored, transported or immediately used for subsequent processing steps with glass reinforcements and additional stabilizers and additives. Alternatively, the polypropylene polymer or polymers are grafted during polymerization in a reactor, then stabilized, stored, transported or immediately used for subsequent processing in an extruder.

The glass fibers can be added any time during processing after the polymer has been initially stabilized with the hindered phenol prophylactic charge. Batch or continuous processes can be used, as long as all components are well dispersed and well blended. A continuous process is presently preferred for ease of operation, and for reduction of exposure of the polymer to thermal processes.

The extrudate is preferably in a strand form which can be chopped into pellets or the like as desired.

Compositions

The glass reinforced molding resin compositions of this invention are summarized in the following Table 1.

TABLE 1

Ranges of Amounts of Components in the Invention Compositions

| Components | Quantity | | |
|---|---|---|---|
| | Broad Range | Intermediate Range | Narrow Range |
| Grafted Polypropylene, wt %[a] | 30–95 | 40–90 | 55–85 |
| Glass, wt %[a] | 5–70 | 10–60 | 15–45 |
| Amino-functional silane, wt %[b] | 0.001–5 | 0.01–1 | 0.03–0.8 |
| Polyurethane film former,[c] wt %[b] | >0–5 | 0.01–3 | 0.15–2.0 |
| Stabilizers and other | 0–20 | 0.1–10 | 0.2–1.0 |

TABLE 1-continued

Ranges of Amounts of Components in the Invention Compositions

| Components | Quantity | | |
|---|---|---|---|
| | Broad Range | Intermediate Range | Narrow Range |
| Additives[d] wt %[a] | | | |

[a]Based on total weight of the composition.
[b]Based on total weight of the sizing and the glass. This is a barely finite amount when expressed as a weight percent based upon total weight of the composition.
[c]The polyurethane film former may be omitted if an amino-functional silane is added to the already sized glass prior to or during extrusion in the amounts of 0.1–2 wt %, 0.2–1 wt % and 0.3–0.8 wt %, based on total weight of the composition, for the broad, intermediate and narrow ranges.
[d]Optional.

EXAMPLES

The following examples will be used to describe the invention and should be taken as illustrative and not restrictive.

Except as noted in the examples, the polypropylene used in these examples was a 12 g/10 min melt flow homopolymer fluff (Marlex® HGL-120-01F) produced by Phillips Petroleum Company.

The glass reinforcing materials used in these examples were commercially produced by CertainTeed Corporation with various sizing compositions designed by CertainTeed for use in particular types of polymer systems. Specifically, CertainTeed 967, sized for use in chemically-coupled polypropylene; CertainTeed 930, sized for use in polybutylene terephthalate; and CertainTeed 993, sized for use in nylon, were used.

Property Testing

The properties of molded test specimens made from the compositions of each of the comparison and invention runs were determined by use of the ASTM procedures shown in Table 2 below.

TABLE 2

| Test Procedures Used | |
|---|---|
| Analysis | ASTM Method No. |
| Tensile Strength at Break (ksi) | D638-89, at 5 mm/min |
| Elongation at Break (%) | D638-89, at 5 mm/min |
| Flexural Strength (ksi) | D790-86, 2 inch span, 1 mm/min |
| Flexural Modulus (ksi) | D790-86, 2 inch span, 1 mm/min |
| Izod Impact Strength, Notched and Unnotched (ft-lb/in) | D256-88 |
| Heat Deflection Temperature (°C.) | D648-82, at 264 psi load |

EXAMPLE I

This example illustrates the superiority of properties obtained by grafting of polypropylene (PP) with maleic anhydride followed by compounding with glass which has been sized for use in nylon, having at least one amino-functional silane and at least one polyurethane film former in the sizing composition.

Stabilized polypropylene fluff (30,000 g, nominal melt flow 12 g/10 min.) was dry mixed for at least 45 minutes with 240 g maleic anhydride (from Aldrich), and 15 g a,a'bis(t-butylperoxy) diisopropylbenzene (a peroxide commercially available as Vulcup® R from Hercules). Then 15.9 g tetrakis(methylene 3-(3,5-di-tert-butyl-4-hydroxyphenyl) proprionate) methane (an antioxidant commercially available as Irganox® 1010 from Ciba Geigy), 15.9 g of an aliphatic thio compound (commercially available from Atochem North America as Anoxsyn ® 442), and 15.9 g calcium stearate were added and the entire mixture was drum tumbled for an additional 15 minutes.

The mixture was then melt blended, grafted and extruded in a Werner Pfliederer ZSK-30 twin screw extruder configured with a general purpose compounding screw. The temperature profile on the extruder was 180° C. at the throat, increasing to 200° C. at the die. The nozzle temperature was 200° C. The screw speed was set at 250 rpm. The feed rate was set so that 70-80 pounds of grafted product was produced per hour. Extrudate obtained from the two-hole die was water-cooled and pelletized.

The grafted, pelletized polypropylene was then compounded in a second extrusion using a single screw Davis Standard extruder (1.5 inch, 24:1 l/d). Glass, at 30% loading and additional stabilizer (0.5 wt % Irganox ® 1010) were dry blended and added at the throat of the single-screw Davis Standard extruder. Temperatures were 375° F. at the feed throat, 400° F. in the rear zone, increasing to 425° F. at the die. Screw speed was 90 RPM. Extrudate was cooled in a water bath and chopped into pellets.

The pelletized compositions were dried overnight at 225° F. prior to injection molding into test specimens. The glass-reinforced compound was then formed into 5 in.×⅛ in.×½ in. tensile bars. Injection molding was carried out in a New Britain 75 Injection Molder with a 75-ton clamp force. The operating conditions were: barrel temperature, 375° F. to 425° F.; nozzle temperature, 425° F.; 5-second injection time; 9-second injection/hold time; 25-second cool/cure time; injection pressure, 300 psig; hold pressure, 400 psig; and mold temperature, 120° F. The bars were then tested for tensile strength, impact strength, percent tensile elongation, and for heat deflection temperature (HDT). The results are shown in Table 3 below.

TABLE 3

The Effect of Chemical Coupling and Glass Sizing on Properties of 30% Glass Reinforced PP[a]

|  | Polypropylene[b] | Maleic Anhydride Grafted Polypropylene[c] | Maleic Anhydride Grafted Polypropylene[d] |
|---|---|---|---|
| CertainTeed 967[e] |  |  |  |
| HDT, °C. @ 264 psi | 145 | 149 | 147 |
| Tensile Strength, KSI | 8.8 | 11.4 | 12.4 |
| Impact, Ft-lb/in |  |  |  |
| Notched Izod | 1.0 | 1.3 | 1.4 |
| Unnotched Izod | 3.8 | 6.5 | 8.5 |
| Tensile Elongation, % | 3.4 | 4.8 | 6.0 |
| CertainTeed 930[f] |  |  |  |
| HDT,°C. @ 264 psi | 125 | 151 | 147 |
| Tensile Strength, KSI | 5.2 | 12.8 | 12.6 |
| Notched Izod | 1.0 | 1.7 | 1.6 |
| Unnotched Izod | 3.4 | 11.2 | 11.2 |
| Tensile Elongation, % | 3.7 | 6.3 | 6.7 |
| CertainTeed 993[g] |  |  |  |
| HDT, °C. @ 264 psi | 114 | 152 | 147 |
| Tensile Strength, KSI | 4.5 | 13.8 | 9.5 |
| Notched Izod | 1.1 | 1.7 | 1.2 |
| Unnotched Izod | 4.9 | 13.4 | 6.0 |
| Tensile Elongation, % | 14.0 | 7.6 | 4.6 |

[a] Each data point is the average of 3 independent runs.
[b] Marlex ® HGL-120-01, commercially available from Phillips Petroleum Company, was used.
[c] Marlex ® HGL-120-01 grafted with maleic anhydride was used.
[d] Maleic anhydride grafted polypropylene, commercially available from Himont Chemicals as Pro-fax PC-072, was used.
[e] CertainTeed 967 is glass sized for use in chemically modified polypropylene having 3/16 in. length and 13 μm fiber diameter.
[f] CertainTeed 930 is glass sized for use in polybutylene terephthalate having ⅛ in. length and 13 μm fiber diameter.
[g] CertainTeed 993 is glass sized for use in nylon having ⅛ in. length and 10 μm fiber diameter.

The physical properties given in Table 3 show that test specimens reinforced with CertainTeed 967 glass (sized for use in chemically modified polypropylene) yielded best properties in non-grafted polypropylene where an HDT of 145° C. was obtained when compared with CertainTeed 930 (sized for use in polybutylene terephthalate) and CertainTeed 933 (sized for use in nylon), which gave, respectively, HDT's of 125° C. and 114° C. Use of CertainTeed 967 and CertainTeed 930 resulted in test specimens with similar high strength values when used in Pro-fax PC-072, while use of CertainTeed 993 (sized for use in nylon) resulted in test specimens with lower tensile and impact strengths.

In contrast, use of extruder-grafted polypropylene reinforced with CertainTeed 993 (sized for use in nylon) unexpectedly gave test specimens the highest tensile and impact strengths. These results demonstrate that when polypropylene is extruder-grafted with maleic anhydride followed by reinforcement with a glass having at least one amino-functional silane and at least one polyurethane film former in the sizing material, articles with unexpectedly high mechanical strengths are obtained.

Furthermore, Table 3 shows that when polypropylene, without grafting with maleic anhydride, was reinforced with glass having at least one amino-functional silane in the sizing material (CertainTeed 993), an improvement in certain properties of test specimens made therefrom also resulted. Tensile elongation of test specimens was 14.0% compared with tensile elongation of 3.4% and 3.7% of specimens made from polypropylene reinforced with glass sized for use in polypropylene and polybutylene terephthalate, respectively. These results, again, are unexpected.

EXAMPLE II

This example illustrates that use of amino-functional silane coupling agents can improve physical properties of articles made from glass-reinforced maleic anhydride-grafted polypropylene (PP-g-MAH).

The test runs were carried out in the same manner as those described in Example I for glass-reinforced PP-g-MAH with the exception that various silane compounds listed in Table 4 were applied directly to CertainTeed 967 glass fiber, at a concentration of 0.5% by weight based on the final compound, followed by drying. The silane-treated glass was then used to reinforce the PP-g-MAH as described in Example I. The physical properties of test specimens made from the silane coupled PP-g-MAH compounds are shown in Table 4.

TABLE 4

Effect of Silane Coupling Agents in Glass Reinforced PP-g-MAH Compounds[a]

| Silane[b] Trade Designation | Silane Functionality | Properties of Resultant Compound | | | |
|---|---|---|---|---|---|
| | | Heat Deflection Temperature | Tensile Strength, KSI | Notched Izod Impact, ft-lb/in | Unnotched Izod Impact, ft-lb/in |
| None | | 149° C. | 12.3 | 1.7 | 7.8 |
| A-189 | Mercapto | 148° C. | 11.4 | 1.6 | 5.4 |
| A-1160 | Ureido | 151° C. | 13.8 | 2.2 | 13.3 |
| A-172 | Vinyl | 151° C. | 11.8 | 1.6 | 6.3 |
| A-174 | Methacryl | 151° C. | 12.1 | 1.6 | 6.9 |
| A-1100 | Amino | 153° C. | 14.5 | 2.3 | 16.2 |
| A-1120 | Amino | 149° C. | 14.0 | 2.3 | 15.2 |
| Y-9576 | Amino | 147° C. | 12.8 | 1.9 | 9.4 |
| TC-100 | Epoxy | 151° C. | 13.4 | 2.0 | 9.8 |

[a]Reinforcement was 30% CertainTeed 967 glass, sized for use in homopolymer and chemically coupled polypropylene resin systems.
[b]Silanes were added to glass at 0.5 wt. percent based on total compound weight. Identification of the silanes is shown in Table 5.

All silanes shown in Table 4 are commercially available from Union Carbide Corporation. An explanation of the trade designations is given in Table 5.

TABLE 5

Trade Designations of Silanes Tested

| Trade Designation | Silane |
|---|---|
| A-1100 | gamma-aminopropyltriethoxysilane |
| A-1120 | N-beta-(aminoethyl)gamma-aminopropyltrimethoxysilane |
| A-1160 | gamma-ureidopropyltriethoxysilane |
| Y-9576 | phenylaminoalkyltrimethoxysilane |
| A-172 | vinyltri(2-methoxyethoxy)silane |
| A-189 | gamma-mercaptopropyltrimethoxysilane |
| A-174 | gamma-methacryloxypropyltrimethoxysilane |
| TC-100 | gamma-glycidoxypropyltrimethoxysilane |

As can be seen in Table 4, using silanes with vinyl (A-172), mercapto (A-189), and methacryl (A-174) functionality caused a slight reduction in tensile and impact strengths of articles made from the reinforced polymer. However, amino (A-1100, A-1120 and Y-9576) and epoxy (TC-100) functional silanes significantly improved the tensile and impact strengths of articles made from the reinforced polymer. For example, 14 or more KSI in tensile strength and from 15.2 to 16.2 ft-lb/in unnotched Izod impact strength were obtained with A-1100 and A-1120 amino-functional silanes. For comparison, with no silane added, the tensile and unnotched Izod impact strengths obtained were 12.3 KSI and 7.8 ft-lb/in, respectively. The heat deflection temperature (HDT) of polypropylene compounds cannot be increased further because of the proximity of the HDT to the polypropylene melting temperature of about 168° C.

While the compositions, methods and articles of manufacture of this invention have been described in detail for the purpose of illustration, the inventive compositions, methods and articles are not to be construed as limited thereby. This patent is intended to cover all changes and modifications within the spirit and scope thereof.

That which is claimed is:

1. A composition comprising:
(a) at least one polymer of propylene;
(b) glass;
(c) at least one amino-functional silane; and
(d) at least one polyurethane;
wherein said at least one polymer of propylene is present in an amount within the range of about 30 to about 95 weight percent, based on total weight of said composition;
wherein said glass is present in an amount within the range of about 5 weight percent to about 70 weight percent, based on total weight of said composition;
wherein said at least one amino-functional silane is present in an amount within the range from a finite amount to about 2 weight percent, based on total weight of said composition; and
wherein said at least one polyurethane is present in an amount within the range from a finite amount to about 5 weight percent, based on total weight of said composition.

2. A composition as recited in claim 1 wherein said at least one polymer of propylene is present in an amount within the range of about 40 to about 90 weight percent, based on total weight of said composition;
wherein said glass is present in an amount within the range of about 10 weight percent to about 60 weight percent, based on total weight of said composition;
wherein said at least one amino-functional silane is present in an amount within the range of about 0.2 weight percent to about 1 weight percent, based on total weight of said composition; and
wherein said at least one polyurethane is present in an amount within the range from 0.01 weight percent to about 3 weight percent, based on total weight of said composition.

3. A composition as recited in claim 1 wherein said at least one polymer of propylene is present in an amount within the range of about 55 to about 85 weight percent, based on total weight of said composition;
wherein said glass is present in an amount within the range of about 15 weight percent to about 45 weight percent, based on total weight of said composition;
wherein said at least one amino-functional silane is present in an amount within the range of about 0.3 weight percent to about 0.8 weight percent, based on total weight of said composition; and
wherein said at least one polyurethane is present in an amount within the range from 0.15 weight percent to about 2.0 weight percent, based on total weight of said composition.

4. A composition as recited in claim 1 wherein said at least one polymer of propylene is a copolymer.

5. A composition as recited in claim 1 wherein said at least one polymer of propylene is grated with a grafting compound selected from the group consisting of vinyl-polymerizable hydrolyzable silanes, carboxylic acids, carboxylic acid derivatives, carboxylic acid anhydrides, carboxylic acid anhydride derivatives, and mixtures thereof in the presence of a free radical generator.

6. A composition as recited in claim 5 wherein said at least one polymer of propylene is present in an amount within the range of about 40 to about 90 weight percent, based on total weight of said composition;
wherein said glass is present in an amount within the range of about 10 weight percent to about 60 weight percent, based on total weight of said composition;
wherein said at least one amino-functional silane is present in an amount within the range from about 0.2 to about 1 weight percent, based on total weight of said composition; and
wherein said at least one polyurethane is present in an amount within the range from about 0.01 to about 3 weight percent, based on total weight of said composition.

7. A composition as recited in claim 5 wherein said at least one polymer of propylene is present in an amount within the range of about 55 to about 85 weight percent, based on total weight of said composition;
wherein said glass is present in an amount within the range of about 15 weight percent to about 45 weight percent, based on total weight of said composition;
wherein said at least one amino-functional silane is present in an amount within the range from about 0.3 to about 0.8 weight percent, based on total weight of said composition; and
wherein said at least one polyurethane is present in an amount within the range from about 0.15 to about 2.0 weight percent, based on total weight of said composition.

8. A method comprising mixing and melt extruding;
(a) at least one polymer of propylene;
(b) glass;
(c) at least one amino-functional silane; and
(d) at least one polyurethane;
wherein said at least one polymer of propylene is present in an amount with the range of about 30 to about 95 weight percent, based on total weight of said composition;
wherein said glass is present in an amount within the range of about 5 weight percent to about 70 weight percent, based on total weight of said composition;
wherein said at least one amino-functional silane is present in an amount within the range from a finite amount to about 2 weight percent, based on total weight of said composition; and
wherein said polyurethane is present in an amount within the range from a finite amount to about 5 weight percent, based on total weight of said composition.

9. A method as recited in claim 8 wherein said at least one polymer of propylene is present in an amount within the range of about 40 to about 90 weight percent, based on total weight of said composition;
wherein said glass is present in an amount within the range of about 10 weight percent to about 60 weight percent, based on total weight of said composition;
wherein said at least one amino-functional silane is present in an amount within the range of about 0.2 weight percent to about 1 weight percent, based on total weight of said composition; and
wherein said at least one polyurethane is present in an amount within the range from 0.01 weight percent to about 3 weight percent, based on total weight of said composition.

10. A method as recited in claim 8 wherein said at least one polymer of propylene is present in an amount within the range of about 55 to about 85 weight percent, based on total weight of said composition;
wherein said glass is present in an amount within the range of about 15 weight percent to about 45 weight percent, based on total weight of said composition;
wherein said at least one amino-functional silane is present in an amount within the range of about 0.3 weight percent to about 0.8 weight percent, based on total weight of said composition; and
wherein said at least one polyurethane is present in an amount within the range from 0.15 weight percent to about 2 weight percent, based on total weight of said composition.

11. A method as recited in claim 8 wherein said at least one polymer of propylene is a copolymer.

12. A method as recited in claim 8 wherein said at least one polymer of propylene is grafted with a grafting compound selected from the group consisting of vinyl-polymerizable hydrolyzable silanes, carboxylic acids, carboxylic acid derivatives, carboxylic acid anhydrides, carboxylic acid anhydride derivatives, and mixtures thereof in the presence of a free radical generator.

13. A method as recited in claim 12 wherein said at least one polymer of propylene is present in an amount within the range of about 30 to about 95 weight percent based on total weight of said composition;
wherein said glass is present in an amount within the range of about 5 weight percent to about 70 weight percent, based on total weight of the composition;
wherein said at least one amino-functional silane is present in an amount within the range from a finite amount to about 2 weight percent, based on total weight of the composition; and
wherein said at least one polyurethane film former is present in an amount within the range from a finite amount to about 5 weight percent, based on total weight of the composition.

14. A method as recited in claim 12 wherein said at least one polymer of propylene is present in an amount within the range of about 40 to about 90 weight percent, based on total weight of said composition;
wherein said glass is present in an amount within the range of about 10 weight percent to about 60 weight percent, based on total weight of said composition;
wherein said at least one amino-functional silane is present in an amount within the range from about 0.2 to about 1 weight percent, based on total weight of said composition; and
wherein said at least one polyurethane is present in an amount within the range from about 0.01 to to about 3 weight percent, based on total weight of said composition.

15. A method as recited in claim 12 wherein said at least one polymer of propylene is present in an amount within the range of about 55 to about 85 weight percent, based on total weight of said composition;

wherein said glass is present in an amount within the range of about 15 weight percent to about 45 weight percent, based on total weight of said composition;

wherein said at least one amino-functional silane is present in an amount within the range from about 0.3 to about 0.8 weight percent, based on total weight of said composition; and wherein said at least one polyurethane is present in an amount within the range from about 0.15 to to about 2 weight percent, based on total weight of said composition.

16. Articles made by the method of claim 8.
17. Articles made by the method of claim 11.
18. Articles made by the method of claim 12.

* * * * *